US007124358B2

(12) United States Patent
Carpenter (10) Patent No.: US 7,124,358 B2
(45) Date of Patent: Oct. 17, 2006

(54) METHOD FOR DYNAMICALLY GENERATING REFERENCE IDENTIFIERS IN STRUCTURED INFORMATION

(75) Inventor: Cory R. Carpenter, Aloha, OR (US)

(73) Assignee: International Business Machines Corporation, Armonk, NY (US)

( * ) Notice: Subject to any disclaimer, the term of this patent is extended or adjusted under 35 U.S.C. 154(b) by 542 days.

(21) Appl. No.: 10/040,129

(22) Filed: Jan. 2, 2002

(65) Prior Publication Data

US 2004/0205047 A1  Oct. 14, 2004

(51) Int. Cl.
*G06F 15/00* (2006.01)
(52) U.S. Cl. ...................... 715/514; 715/513
(58) Field of Classification Search ............... 715/513, 715/514, 530, 500; 345/853; 707/3, 4, 5
See application file for complete search history.

(56) References Cited

U.S. PATENT DOCUMENTS

| 5,504,891 | A | * | 4/1996 | Motoyama et al. | 715/513 |
|---|---|---|---|---|---|
| 5,893,109 | A | * | 4/1999 | DeRose et al. | 707/104.1 |
| 5,905,991 | A | * | 5/1999 | Reynolds | 715/501.1 |
| 6,009,434 | A | * | 12/1999 | Chui et al. | 707/100 |
| 6,016,494 | A | * | 1/2000 | Isensee et al. | 707/102 |
| 6,047,126 | A | * | 4/2000 | Imai | 706/47 |
| 6,122,647 | A | * | 9/2000 | Horowitz et al. | 715/513 |
| 6,167,409 | A | * | 12/2000 | DeRose et al. | 715/513 |
| 6,269,380 | B1 | * | 7/2001 | Terry et al. | 707/200 |
| 6,279,005 | B1 | * | 8/2001 | Zellweger | 707/101 |
| 6,298,357 | B1 | * | 10/2001 | Wexler et al. | 715/513 |
| 6,300,957 | B1 | * | 10/2001 | Rao et al. | 345/441 |
| 6,356,898 | B1 | * | 3/2002 | Cohen et al. | 707/5 |
| 6,457,028 | B1 | * | 9/2002 | Pitkow et al. | 715/513 |
| 6,480,849 | B1 | * | 11/2002 | Lee et al. | 707/8 |
| 6,493,717 | B1 | * | 12/2002 | Junkin | 707/102 |
| 6,510,425 | B1 | * | 1/2003 | Okamoto et al. | 707/3 |
| 6,546,406 | B1 | * | 4/2003 | DeRose et al. | 715/513 |
| 6,549,221 | B1 | * | 4/2003 | Brown et al. | 345/854 |
| 6,557,040 | B1 | * | 4/2003 | Friedman et al. | 709/230 |
| 6,635,089 | B1 | * | 10/2003 | Burkett et al. | 715/513 |
| 6,654,761 | B1 | * | 11/2003 | Tenev et al. | 707/102 |
| 6,728,733 | B1 | * | 4/2004 | Tokui | 707/200 |
| 6,741,242 | B1 | * | 5/2004 | Itoh et al. | 345/419 |
| 6,751,777 | B1 | * | 6/2004 | Bates et al. | 715/501.1 |
| 2002/0059272 | A1 | * | 5/2002 | Porter | 707/100 |

(Continued)

OTHER PUBLICATIONS

Jang et al., An Effective Mechanism for Index Update in Structured Documents, ACM 1999, pp. 383-390.*

(Continued)

*Primary Examiner*—Cong-Lac Huynh
(74) *Attorney, Agent, or Firm*—Lieberman & Brandsdorfer, LLC (57) ABSTRACT

A method for dynamically creating a reference identifier in an electronic document formatted as a data structure is provided. Hierarchy in the data structure is followed to reach the root of the data structure, and the data structure is traversed from the root until a target object is encountered. A reference identifier is generated from a location of the target object. As the data structure is traversed, a counter is incremented when a specified branch of the data structure is encountered, and the counter is cleared when a specified branch of the data structure is closed. The reference identifier may be updated to reflect changes in the data structure. Such changes are reflected on a browser upon reloading the browser page. Accordingly, the reference identifier reflects a location of a target object within the structure of the hierarchy of the document.

21 Claims, 5 Drawing Sheets

U.S. PATENT DOCUMENTS

| | | |
|---|---|---|
| 2002/0107838 A1* | 8/2002 | Tsai .............................. 707/3 |
| 2002/0107840 A1* | 8/2002 | Rishe ........................... 707/3 |
| 2002/0111968 A1* | 8/2002 | Ching ....................... 707/514 |
| 2002/0120598 A1* | 8/2002 | Shadmon et al. .............. 707/1 |
| 2002/0138456 A1* | 9/2002 | Levy et al. .................... 706/25 |
| 2002/0152222 A1* | 10/2002 | Holbrook ................. 707/104.1 |
| 2002/0156803 A1* | 10/2002 | Maslov et al. .............. 707/500 |
| 2002/0174201 A1* | 11/2002 | Ramer et al. ............... 709/220 |
| 2002/0199061 A1* | 12/2002 | Friedman et al. ........... 711/118 |
| 2003/0037056 A1* | 2/2003 | Sedlar ........................ 707/100 |
| 2003/0110150 A1* | 6/2003 | O'Neil et al. .................. 707/1 |
| 2005/0033745 A1* | 2/2005 | Wiener et al. ................ 707/10 |
| 2005/0080902 A1* | 4/2005 | Parupudi et al. ............ 709/226 |
| 2005/0086216 A1* | 4/2005 | Davis ............................ 707/3 |
| 2006/0143579 A1* | 6/2006 | Torgerson ................... 715/854 |

OTHER PUBLICATIONS

Floyd, Total DOMination, Web Techniques, Oct. 2000, vol. 5, Iss. 10, p. 79, 7 pgs.*
Tanaka et al., Query Pairs as Hypertext Links, IEEE 1991, pp. 456-463.*
Lee et al., Index Structures for Structured Documents, ACM 1996, pp. 91-99.*
Fuhr et al., XIRQL : A Query Language for Information Retrieval in XML Documents, ACM 2001, pp. 172-180.*
Shin et al., BUS : An Effective Indexing and Retrieval Scheme in Structured Documents, ACM 1998, pp. 235-243.*
DeRose, Expanding the Notion of Links, ACM Nov. 1989, pp. 249-257.*

* cited by examiner

METHOD FOR DYNAMICALLY GENERATING REFERENCE IDENTIFIERS IN STRUCTURED INFORMATION

BACKGROUND OF THE INVENTION

1. Technical Field

This invention relates generally to information retrieval in a computer network. More particularly, it relates to an improved method of locating information in a structured information environment

2. Description Of The Prior Art

It is well known in the computer field to couple a plurality of computer systems into a network of computer systems. By creating a network of computer systems, collective resources available within the network may be shared among users of the network. With the growth of computerized distributed information resources, such as the Internet and private Intranets, sharing of computer resources is now commonly available. Both the Internet and Intranets have become a source for sharing information on medium and larger scale systems and allow users to retrieve vast amounts of electronic information previously unavailable in an electronic medium.

Networked systems utilizing hypertext conventions typically follow a client-server architecture. A client is usually a computer that requests a service provided by another computer known as a server. The server is typically a remote computer system accessible over a communications medium. Based upon requests by the user at the client, the server presents information to the user as responses to the client. The client typically contains a program called a browser that communicates the requests to the server and formats the responses for viewing at the client. The server is typically a remote computer system accessible over a communications medium. The server scans and searches for unprocessed information sources based upon requests by the user. The server presents filtered electronic information to the user as server responses to the client. The client may be active in a first computer system and the server process may be active in a second computer system. This allows the client and server to communicate with one another over a communications medium thereby allowing multiple clients to take advantage of the information-gathering capabilities of the server. Accordingly, a server is a network computer that executes administrative software that controls access to all or part of the network and its resources, and makes resources available to remote users on the network.

One common use of the Internet and private Intranets is providing access to files within the system. A standard page description language known as the Hypertext Markup Language (HTML) provides basic document formatting and allows the developer to specify links to servers and specific files stored on the servers and their associated media. Retrieval of information is generally achieved through the use of a browser at a client machine. A network path to a server is identified by a Uniform Resource Locator (URL) having a syntax for defining a network connection. When the user of the browser specifies a link via a URL, the client issues a request to a naming service to map a hostname in the URL to a particular network Internet Protocol (IP) address at which the server is located. The naming service returns a list of one or more IP addresses that can respond to the request. Using one of the IP addresses, the browser establishes a connection to a server identified with the IP address. If the server is available, it returns a document or other object formatted according to HTML. Accordingly, browsers have become a primary interface for access to many network and server services.

One problem with retrieving information on the Internet is the amount of time required to sift through the enormous amount of information available to find the files that are of interest for the specific search request. A substantial amount of user time is required to refine search strategies and compile and discard results. Most prior art electronic document delivery systems use HTML formatted documents for search and delivery to the user. In these systems the entire documentation set is often batch processed and contextual information may be incorporated into the documentation directly or by reference. Every time content in the documentation is amended, such as inserted, removed, and/or reorganized, the entire documentation must be reindexed. Accordingly, it is desirable to provide a method for efficiently generating reference identifiers in electronic documentation that overcomes the drawbacks of the prior art.

SUMMARY OF THE INVENTION

It is therefore an object of the invention to dynamically generate a reference identifier in an electronic document and to deliver the document with the reference identifier to the user through the hypertext transfer protocol.

A first aspect of the invention is a method for dynamically creating a reference identifier in an electronic document. The document is formatted into a data structure, and the hierarchy of the data structure is followed to reach the root of the data structure. The data structure is traversed from the root until a target object is encountered. A reference identifier is generated based upon a location of the target object in the data structure. The step of traversing the data structure preferably includes incrementing a counter when a specified branch of the data structure is encountered, and clearing the counter when a specified branch of the data structure is closed. The data structure may be recursively traversed from the root. In addition, the reference identifier may be updated to reflect changes in the data structure. The step of updating the reference identifier preferably includes resetting an index for the data structure when content of the data structure is inserted, removed, reorganized, or otherwise amended.

A second aspect of the invention is a computer system having a data structure, a manager responsive to a traverse request of the data structure, and a marker to identify a position of a target object in the data structure. A counter increment responsive to the manager is preferably provided if a specified branch in the data structure matches the traverse request. Alternatively, a counter clearance responsive to the manager may be provided if a specified branch in the data structure is closed. In addition, a modified marker may be provided in response to inserted content, removed content, reorganized content or other amendment to the data structure.

A third aspect of the invention is an article comprising a computer-readable signal bearing medium. The article includes means in the medium for following a hierarchy of a data structure to reach the root of the data structure, means in the medium for traversing the data structure from the root, and means in the medium for identifying a position of a target object in the data structure. The medium is preferably selected from the group consisting of a recordable data storage medium and a modulated carrier signal. The traversal means preferably generates a counter increment responsive to a match of a specified branch in the data structure to a search request. Alternatively, the traversal means may generate a counter clearance responsive to an encounter of a closed branch of the data structure to a search request.

Other features and advantages of this invention will become apparent from the following detailed description of the presently preferred embodiment of the invention, taken in conjunction with the accompanying drawings.

DESCRIPTION OF THE PREFERRED EMBODIMENT

Technical Background

Recently, it has become common for technical documents to be encoded in a standard markup language, such as Standard Generalized Markup Language (SGML) and Extensible Markup Language (XML). Both the SGML and XML languages utilize clear text character sets such as ASCII or Unicode to store both content and structure of a document. Both of these languages encode the documents into a predefined organizational structure. Therefore, there is no preprocessing of the document required following amendment to the document content. Revisions to the document content and structure are reflected immediately. Context internal to a document is reflected by the document's structure, while context of references to subsets of other documents have no contextual reference, merely a target value. Accordingly, electronic documents encoded in SGML and/or XML format are dynamically updateable and do not require reindexing of contextual information subsequent to amendment of document content.

Organization of electronic documents in a repository is controlled by an XML document that defines how the contents of the library should be organized. The XML document is a data structure in the form of a digital tree. Data structures in the form of trees are efficient tools for supporting searches beginning with a known identifier. A tree is a data structure accessed first at a root node. Each subsequent node can be either an internal node with further subsequent nodes, or an external node with no further nodes existing under the node. An internal node refers to or has links to one or more descending or child nodes and is referred to as the parent of its child nodes, and external nodes are commonly referred to as leaves. The root node is usually depicted at the top of the tree structure and the external nodes are depicted at the bottom of the tree structure. A navigation system interface uses information retrieved from the XML document to construct a data structure tree interface. The lowest level of the tree of the XML document provides a pointer to a document in a document repository. The intermediate levels of the tree are constructed using data retrieved from the electronic document. It is the intermediate levels of the tree that are dynamically updated through navigation. A reference identifier is a navigational cue that reflects the structure of the hierarchy of a digital tree. When a document is formatted as a digital tree, reference identifiers may be generated to reference a document fragment within a larger document, or a set of documents, based upon the structural organization of the tree. The process of generating reference identifiers in structured information and presenting them to a client workstation requires both navigation and content delivery. Accordingly, navigation of an XML document in combination with the content delivery mechanism provides delivery of reference identifiers directly to a client workstation.

Technical Details

Figure 1:
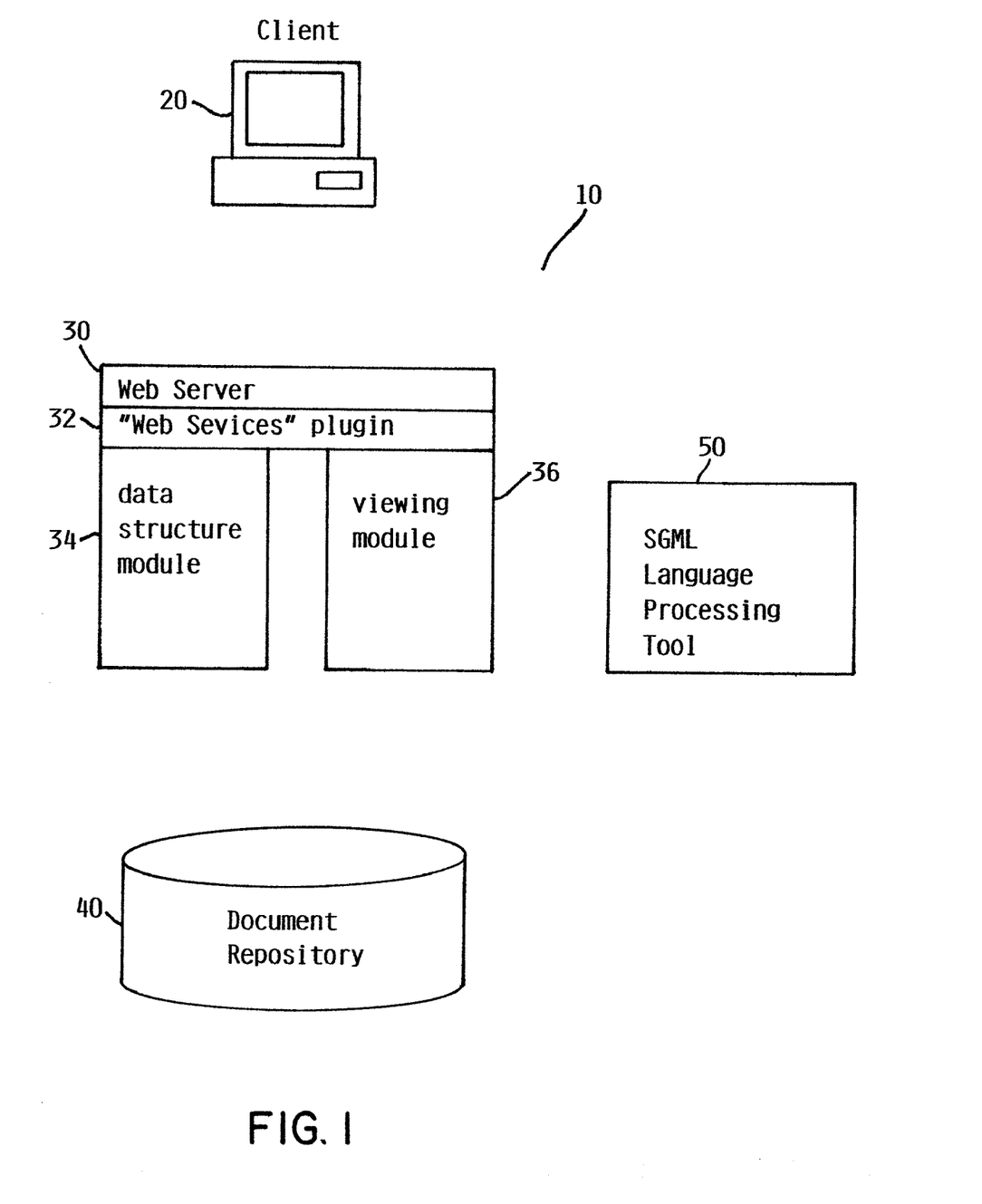
FIG. 1 is a block diagram of a computer system for generating reference identifiers according to the preferred embodiment of this invention, and is suggested for printing on the first page of the issued patent.

FIG. 1 is a block diagram 10 of the components of a computer system used in dynamically generating reference identifiers in electronic documentation. There are four components in the system: a client workstation 20, a server 30, a document repository 40, and an SGML language processing tool 50. The server 30 includes a communication module 32 for allowing the server to communicate with the database, a data structure module 34 for enabling traversal of the hierarchy of a data structure, and a viewing module 36 for controlling formatting of electronic documents. The communication module 32 is a document retrieval system for extracting documents or document fragments from the document repository 40, translating extracted data in the documents or document fragments from the document repository 40 from SGML to HTML, and presenting the extracted data to the client workstation 20. Actual delivery of the extracted data to the client workstation 20 is controlled by the server 30. The SGML language process tool 50 translates and formats SGML document content into HTML format for delivery to the client workstation 20 through hypertext transfer protocol (HTTP). The document repository 40 is a database or hierarchy in a file system, such as folders on a hard drive. The database may be a relational database or an object oriented database. Although some of the components of the system may be commercially available, it is the interaction of the commercially available components with the novel modules that allow the system to dynamically generate reference identifiers in electronic documentation.

Figure 2:
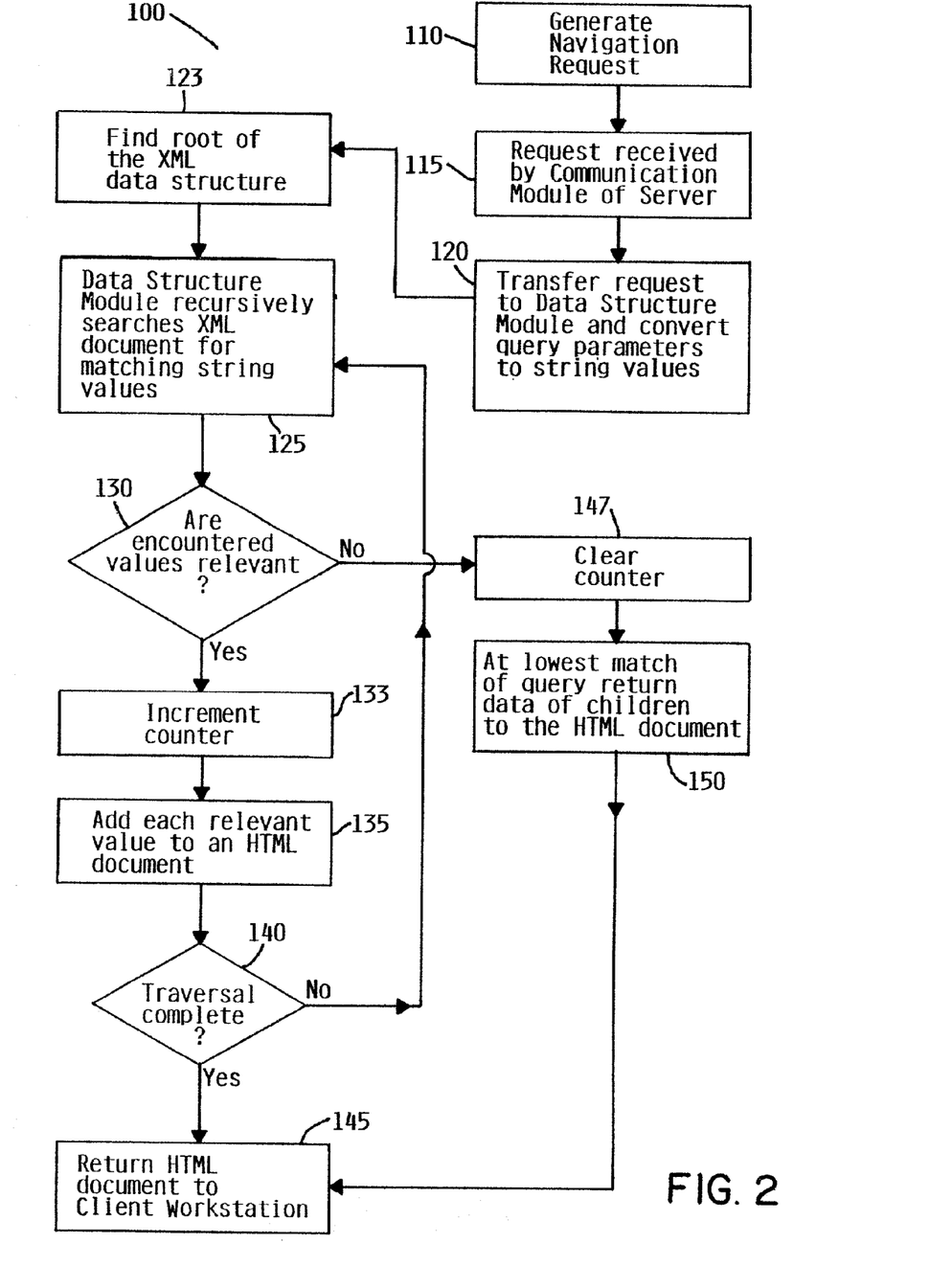
FIG. 2 is a flow chart illustrating the process for returning a reference identifier to a client workstation.

FIG. 2 is a flow diagram 100 illustrating a sample navigation request and content delivery cycle for returning a reference identifier to a client workstation. The client generates a navigation request 110. The navigation request is received in an HTTP encoded format. The navigation request is received by the communication module of the server 115. Thereafter, the navigation request is transferred from the communication module of the server to the data structure module of the server 120. At step 120, the data structure module converts the navigation request from the HTTP encoded format to string values corresponding to XML elements. All searches in the XML data structure are initiated at the root of the data structure. Therefore, the hierarchy of the XML document is followed until the root of the data structure is attained 123. The data structure module then searches the XML document for matching string values in the relevant attributes of the XML document elements 125. The searches in steps 123 and 125 are preferably conducted recursively. A determination must be made to assess whether the values encountered in the tree traversal are relevant 130 to the predefined elements. If a specified branch of the data structure is encountered, a counter is incremented 133. Each relevant attribute value from each encountered element in the XML document is added to an HTML document with formatting indicating the depth of each element in the XML document tree 135. Retrieved attribute values are built up as HTTP query strings and encoded as a URL target for HTML elements inserted into the HTML document. However, if at step 130 the specified branch of the data structure is determined to be closed, then the counter is cleared 147 and the lowest match of the query is returned to the HTML document 150. The HTML document is returned to the client workstation as new content 145. Following step 135, a determination as to whether traversal of the data structure is complete must be assessed 140. When traversal of the XML document is complete, the HTML document is returned to the client workstation as new content 145. However, if an attribute value does not match an incoming query parameter for its element, that element is not traversed. At the lowest match of the query to the XML document, the data structure enumerates that subtree and returns the data for its children 150, and the HTML document is returned to the client workstation as new content 145. The data in the HTML document returned to the client workstation contains reference identifiers that reflect the structure of the hierarchy of the document.

Figure 3:
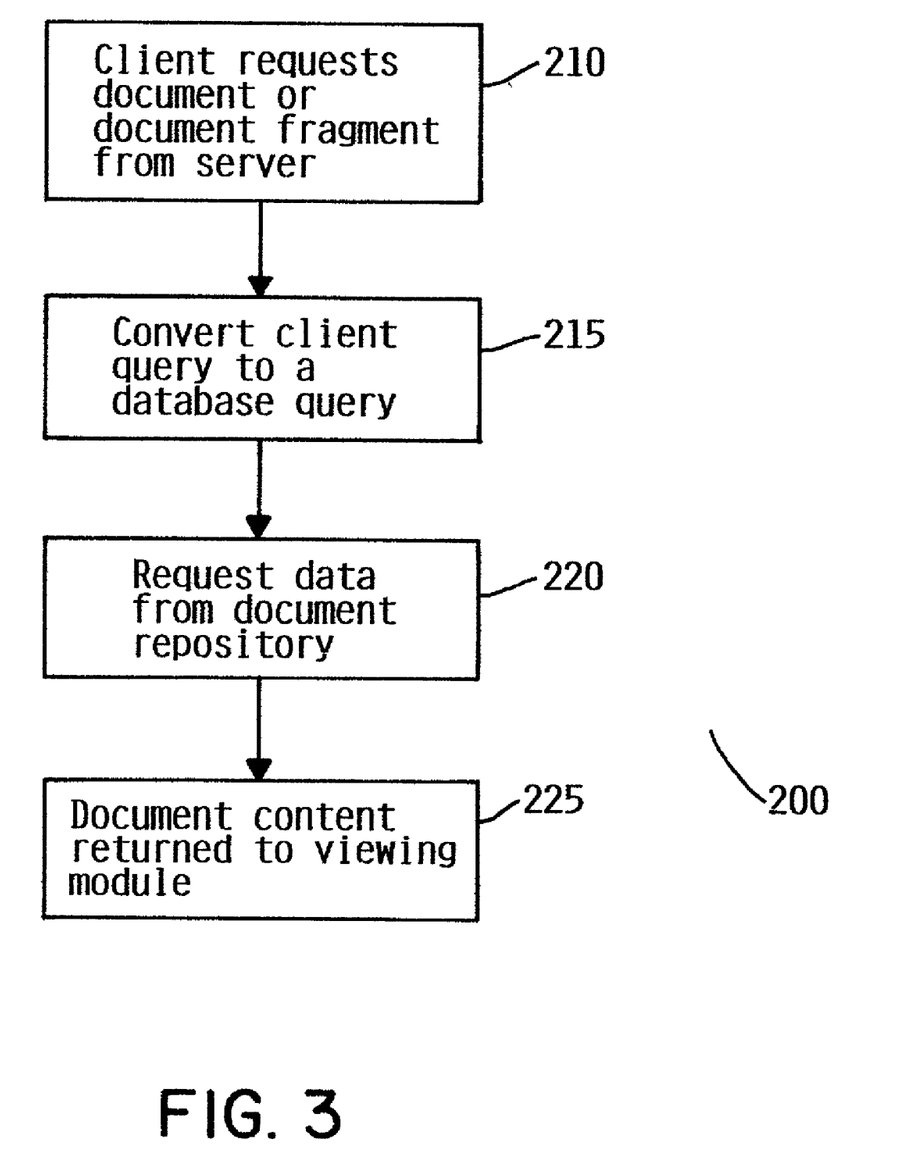
FIG. 3 is a flow chart illustrating the first phase for generating content relative identifiers in retrieved data.

In addition to generating reference identifiers for retrieved content, content relative reference identifiers in retrieved data can be generated. This process occurs in three phases. FIG. 3 is a flow diagram 200 illustrating the first phase of this process involving processing retrieved content. The first step is for a client to request a particular document or document fragment 210. The request is sent from the client workstation 20 to the server 30. The viewing module 36 of the server converts the client generated query into a database query 215. The viewing module 36 then initiates the retrieval of the document content from the document repository 40 by establishing hierarchical location of the content within the entire document 220. The document content is returned to the viewing module in SGML format 225. Accordingly, FIG. 3 demonstrates the first phase in the process of the content delivery cycle for generating content relative reference identifiers.

Figure 4:
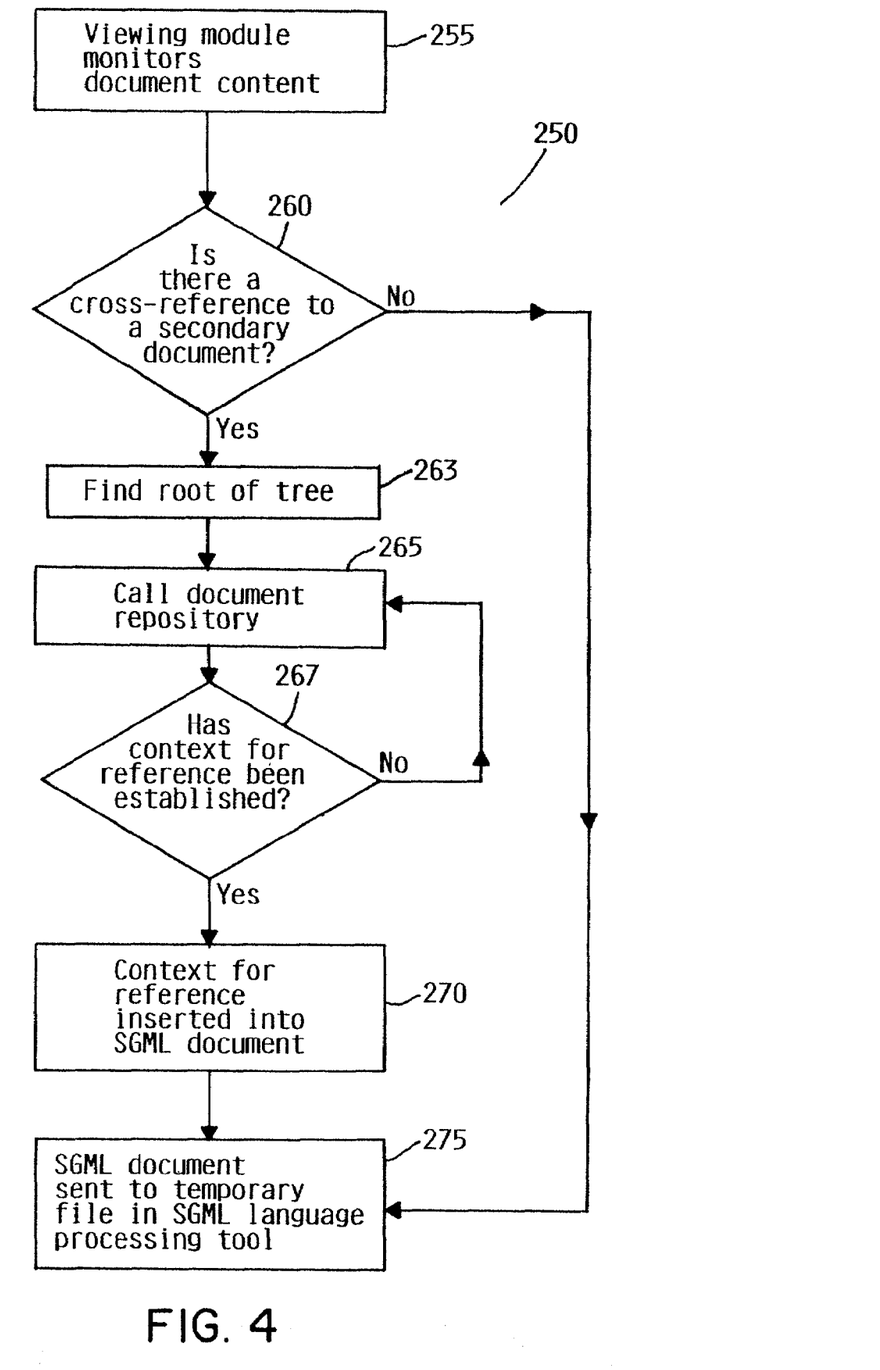
FIG. 4 is a flow chart illustrating the second phase for generating content relative identifiers in retrieved data.

FIG. 4 is a flow diagram 250 illustrating the second phase for processing retrieved content. The viewing module 36 monitors the document content returned in step 225 in the first phase for specific attributes to resolve the context of cross references 255. For example, a reference to another document would require inserting correct numbering in a cross-reference hyperlink. A determination must then be made if a cross-reference to a secondary document is present in the document content returned from the viewing module 260. If the determination at step 260 is positive, the hierarchy of the data structure is followed to find the root of the tree 263 and the application program interface accesses the document repository to resolve the context of the cross-reference 265. Once the context for the secondary reference has been established 267, the cross-reference information is inserted into an SGML formatted document and returned to the viewing module 270. The viewing module sends the returned SGML document together with the cross-reference information to the SGML language process tool 275. Accordingly, the second phase for generating content relative identifiers outlines the algorithm for resolving cross-references to secondary documents.

Figure 5:
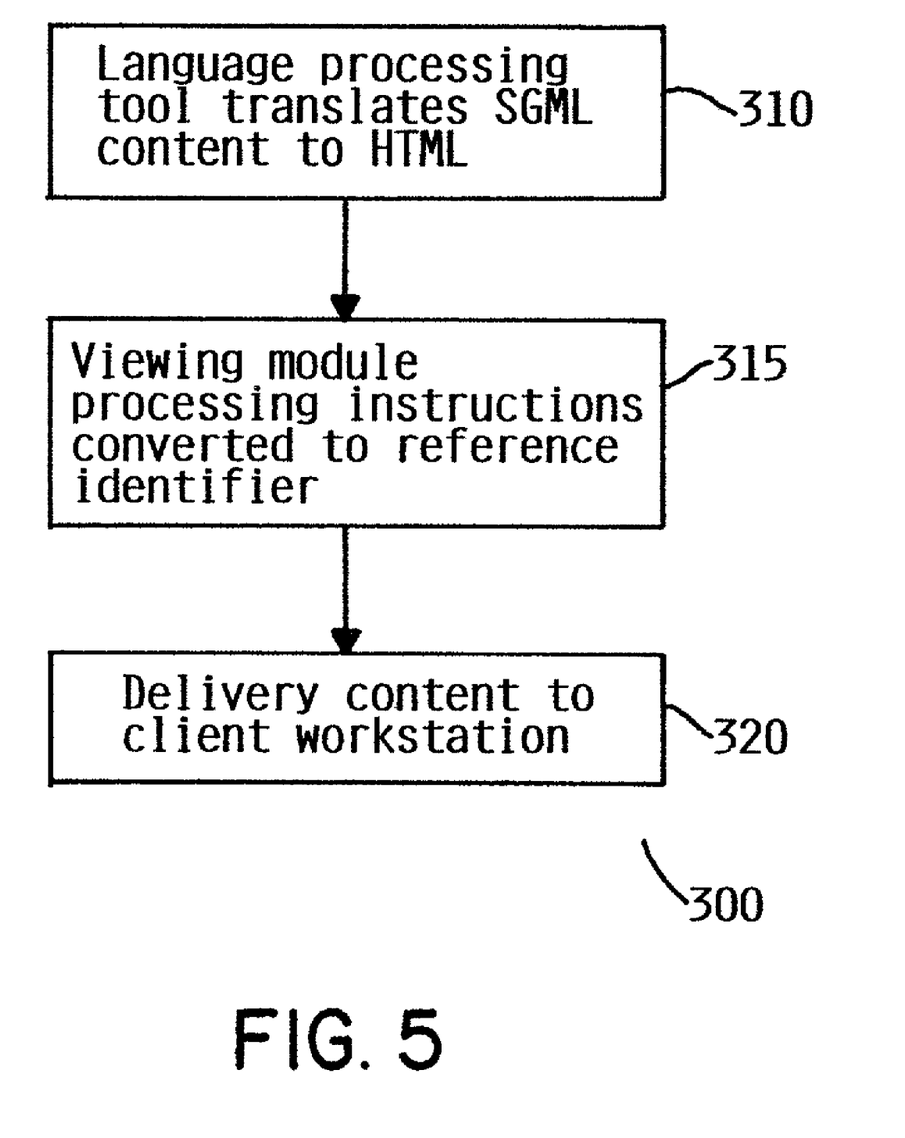
FIG. 5 is a flow chart illustrating the third phase for generating content relative identifiers in retrieved data.

FIG. 5 is a flow diagram 300 illustrating the third phase for processing retrieved content. Following receipt of an SGML document resolving the cross-reference to a secondary document at step 275, the language processing tool translates the SGML document content to HTML format 310, and the cross-reference information inserted by the viewing modules is converted to a reference identifier(s) according to the SGML element in which they occur or in which the element to which they refer occurs 315. The viewing module delivers the HTML document through the web server to the client workstation 320. In some cases the content of the delivered HTML document may contain a new navigation query. If this occurs, the process returns to step 210 of FIG. 3. Accordingly, the third phase for generating content relative identifiers converts the reference identifiers in the SGML document to HTML format and delivers the HTML document to the client workstation The process of generating reference identifiers is the ability to generate a link in a user interface to a document or a section in a document. The reference identifier provides a location of a referenced object in the context of it's parent document. Since SGML and XML formatted documents are hierarchical, amendments to the document are reflected immediately and do not require re-formatting. Amendment to a document may include inserted content, removed content, and reorganized content, as well as other forms of amendment to a document. When a client reloads a browser page, the reference identifiers are updated to reflect changes in the data structure, i.e. the XML and SGML documents. Accordingly, since a reference identifier is a link in the user interface to a document or a section in a document, the process of updating a reference identifier to an amended document includes resetting an index for the data structure.

Advantages Over The Prior Art

The preferred embodiment of the invention provides a method for creating a reference identifier to a target object in a data structure. The method outlined in the preferred embodiment enables dynamic creation of a reference identifier to an electronic document. SGML and XML formatted documents are hierarchical by nature. The format of the documents in either of these languages enables authors to amend the documents without recompiling the documents. Any prior reference identifier to a section within a document is regenerated when a user executes a reload from a client workstation. Accordingly, a reference identifier to a document or a cross-referenced document is dynamic by nature.

Alternative Embodiments

It will be appreciated that, although specific embodiments of the invention have been described herein for purposes of illustration, various modifications may be made without departing from the spirit and scope of the invention. In particular, the invention could be used with document sources stored in a relational database or in folders on a filesystem instead of in an object-oriented database as illustrated herein. Additionally, the process of generating reference identifiers could be employed in the generation of content to be stored or presented in a persistent medium such as print. Accordingly, the scope of protection of this invention is limited only by the following claims and their equivalents.

I claim:

1. A method for creating a reference identifier in an electronic document formatted as a data structure, comprising:
    (a) following hierarchy of said data structure to reach a root of said data structure;
    (b) traversing the data structure for a matching string value in said document from said root until a target object is encountered, wherein said string value is selected from a group consisting of: a document and a document fragment;
(c) dynamically generating said identifier for retrieved content in said document based upon said string value from a location of said target object in said data structure, wherein the step of generating said identifier includes adding a relevant attribute of an encountered element in said data structure to an HTML document indicating a depth of said element in said data structure, including encoding said attribute as a URL; and
(d) generating content relative identifiers in retrieved data, comprising:
resolving context of a cross reference to a secondary document from said retrieved content; and
converting said cross reference context to a reference identifier.

2. The method of claim 1, wherein the step of traversing the data structure includes incrementing a counter when a specified branch of the data structure is encountered.

3. The method of claim 1, wherein the step of traversing the data structure includes clearing a counter when a specified branch of the data structure is closed.

4. The method of claim 1, wherein the step of traversing the data structure includes recursively traversing the data structure.

5. The method of claim 1, further comprising the step of updating said reference identifier to reflect changes in said data structure.

6. The method of claim 5, wherein the step of updating said reference identifier includes resetting an index for said data structure when content of said data structure is amended.

7. The method of claim 6, wherein amended content includes content selected from the group consisting of: inserted content, removed content, and reorganized content.

8. The method of claim 1, wherein said data structure is a standardized mark-up language.

9. A computer system comprising:
an electronic document formatted as a data structure;
a manager responsive to a traverse request having a string value and to match said string value of said request with said data structure;
said manager is adapted to generate an identifier for said matched string value of an encountered element in said document to an HTML document with an indicator for a depth of said element in said data structure in response to said traverse request, and to encode said attribute as a URL; and
said manager adapted to generate a content relative identifier from said matched string value through resolution of context of a cross reference to a secondary document and to convert said cross reference to a reference identifier.

10. The system of claim 9, further comprising a counter increment responsive to said manager if a specified branch in said data structure matches said traverse request.

11. The system of claim 9, further comprising a counter clearance responsive to said manager if a specified branch in said data structure is closed.

12. The system of claim 9, further comprising a modified marker in response to an amendment to said data structure.

13. The system of claim 12, wherein said amendment to said data structure is selected from the group consisting of: inserted content, removed content, and reorganized content.

14. The system of claim 9, wherein said data structure is standardized mark-up language.

15. An article comprising:
a computer-readable medium;
means in the medium for following hierarchy in a data structure;
means in the medium for traversing said data structure to match a string value in said data structure, wherein said string value is selected from a group consisting of: a document and a document fragment;
means in the medium for dynamically generating an identifier for retrieved content in said data structure from a position of a target object in said data structure, wherein said means for generating said identifier includes adding a relevant attribute of an encountered element in said data structure to an HTML document indicating a depth of said element in said data structure, including encoding said attribute as a URL; and
means in the medium for generating content relative identifiers in said retrieved content, including resolving context of a cross reference to a secondary document and converting said cross reference to a reference identifier.

16. The article of claim 15, wherein the medium is a recordable data storage medium.

17. The article of claim 15, wherein said traversal means generates a counter increment responsive to a match of a specified branch in said data structure to a search request.

18. The article of claim 15, wherein said traversal means generates a counter clearance responsive to an encounter of a closed branch of said data structure to a search request.

19. A method for dynamically creating a reference identifier in an electronic document formatted as a data structure, comprising:
(a) following hierarchy of said data structure to reach a root of said data structure;
(b) recursively traversing the data structure for a matching string value in said document from said root until a target object is encountered, wherein said string value is selected from a group consisting of: a document and a document fragment;
(c) wherein the step of traversing the data structure includes changing a counter when a branch of said data structure is encountered;
(d) generating said identifier for said matching string value in said document from a location of said target object in said data structure, wherein the step of generating said identifier includes adding a relevant attribute of an encountered element in said data structure to an HTML document indicating a depth of said element in said data structure, including encoding said attribute as a URL; and
(e) generating a content relative identifier in retrieved data, comprising:
resolving context of a cross reference to a secondary document from said retrieved content, and converting said cross reference to a reference identifier.

20. The method of claim 19, wherein the step of traversing the data structure includes clearing said counter when a specified branch of said data structure is closed and a target object is null, and incrementing said counter when a specified branch of said data structure is encountered.

21. The method of claim 19, further comprising the step of updating said reference identifier to reflect changes in said data structure.

* * * * *